United States Patent
Yi et al.

(10) Patent No.: US 11,115,855 B2
(45) Date of Patent: Sep. 7, 2021

(54) METHOD FOR TRANSMITTING UL PACKET BASED ON QUALITY OF SERVICE (QOS) FLOW IN WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Heejeong Cho, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/477,858

(22) PCT Filed: Jan. 11, 2018

(86) PCT No.: PCT/KR2018/000516
§ 371 (c)(1),
(2) Date: Jul. 12, 2019

(87) PCT Pub. No.: WO2018/131902
PCT Pub. Date: Jul. 19, 2018

(65) Prior Publication Data
US 2020/0128430 A1    Apr. 23, 2020

Related U.S. Application Data

(60) Provisional application No. 62/446,351, filed on Jan. 13, 2017, provisional application No. 62/446,832, filed on Jan. 16, 2017.

(51) Int. Cl.
*H04W 74/08*        (2009.01)
*H04W 28/02*        (2009.01)
(Continued)

(52) U.S. Cl.
CPC ..... *H04W 28/0268* (2013.01); *H04L 47/2483* (2013.01); *H04W 28/0263* (2013.01);
(Continued)

(58) Field of Classification Search
CPC .......... H04W 28/0268; H04W 72/1284; H04L 47/2483
See application file for complete search history.

(56) References Cited

U.S. PATENT DOCUMENTS 6,631,122 B1 * 10/2003 Arunachalam ... H04L 29/06027
370/236.1
7,453,851 B2 * 11/2008 Westphal .............. H04L 47/824
370/331
(Continued)

FOREIGN PATENT DOCUMENTS

JP        2011239471        11/2011

OTHER PUBLICATIONS

Priority document 10-2016-0098954 for U.S. Appl. No. 15/668,571 (Year: 2016).*
(Continued)

*Primary Examiner* — Parth Patel
(74) *Attorney, Agent, or Firm* — Lee, Hong, Degerman, Kang & Waimey

(57) ABSTRACT

Disclosed embodiments include a method and a device for transmitting UL packet based on QoS flow, the method including receiving uplink (UL) packet from an upper layer; checking whether a IP flow of the UL packet is matched to any of UL IP flow to QoS flow mapping defined in QoS rules configured to the UE; setting a QoS Flow ID of the UL packet to a special value if a IP flow of the UL packet is not matched to any of UL IP flow to QoS flow mapping defined in the QoS rules configured to the UE; and transmitting the UL packet with the QoS Flow ID set to the special value to
(Continued)

a network via a DRB. The UE is capable of communicating with at least one of another UE, a UE related to an autonomous driving vehicle, a base station or a network.

5 Claims, 16 Drawing Sheets

(51) Int. Cl.
  *H04W 76/27* (2018.01)
  *H04L 12/851* (2013.01)
  *H04W 72/12* (2009.01)
  *H04W 88/02* (2009.01)

(52) U.S. Cl.
  CPC ....... *H04W 72/1284* (2013.01); *H04W 76/27* (2018.02); *H04W 88/02* (2013.01)

(56) References Cited

U.S. PATENT DOCUMENTS

| | | | | |
|---|---|---|---|---|
| 8,184,533 | B2* | 5/2012 | Jin | H04L 47/10 370/230 |
| 8,917,625 | B2* | 12/2014 | Li | H04W 56/00 370/253 |
| 9,525,517 | B2* | 12/2016 | Chen | H04W 72/0446 |
| 9,717,016 | B2* | 7/2017 | Zeng | H04W 28/0205 |
| 2003/0227880 | A1* | 12/2003 | Heller | H04L 47/14 370/328 |
| 2008/0046565 | A1* | 2/2008 | Liu | H04L 65/1043 709/225 |
| 2009/0103454 | A1* | 4/2009 | Watanabe | H04L 47/805 370/254 |
| 2009/0238192 | A1* | 9/2009 | Dolganow | H04L 47/10 370/400 |
| 2009/0279430 | A1* | 11/2009 | Huber | H04W 72/1226 370/230.1 |
| 2010/0208609 | A1* | 8/2010 | Sundarraman | H04L 47/2416 370/252 |
| 2011/0078783 | A1* | 3/2011 | Duan | H04L 63/0272 726/15 |
| 2011/0235514 | A1* | 9/2011 | Huang | H04W 76/15 370/235 |
| 2011/0267943 | A1* | 11/2011 | Huang | H04W 72/087 370/230 |
| 2012/0144062 | A1* | 6/2012 | Livet | H04W 60/005 709/239 |
| 2014/0153392 | A1* | 6/2014 | Gell | H04W 4/60 370/230 |
| 2014/0155043 | A1* | 6/2014 | Gell | H04L 67/02 455/414.1 |
| 2015/0063144 | A1* | 3/2015 | Kozat | H04W 40/12 370/252 |
| 2015/0215933 | A1* | 7/2015 | Naslund | H04B 17/20 370/252 |
| 2015/0319092 | A1* | 11/2015 | Ghai | H04L 47/12 370/230 |
| 2016/0037428 | A1* | 2/2016 | Kanugovi | H04L 69/16 370/329 |
| 2016/0219510 | A1* | 7/2016 | Asterjadhi | H04L 5/0007 |
| 2016/0338073 | A1 | 11/2016 | Nuggehalli et al. | |
| 2016/0338102 | A1* | 11/2016 | Nuggehalli | H04W 72/10 |
| 2017/0289836 | A1* | 10/2017 | Lovsen | H04L 47/32 |
| 2017/0303287 | A1* | 10/2017 | Yu | H04L 67/146 |
| 2018/0041936 | A1* | 2/2018 | Kim | H04W 4/70 |
| 2018/0063747 | A1* | 3/2018 | Anchan | H04W 28/10 |
| 2018/0146398 | A1* | 5/2018 | Kim | H04W 72/0406 |
| 2018/0192426 | A1* | 7/2018 | Ryoo | H04W 74/0833 |
| 2018/0234877 | A1* | 8/2018 | Liu | H04L 61/6022 |
| 2018/0242205 | A1* | 8/2018 | Mildh | H04W 36/0016 |
| 2018/0270695 | A1* | 9/2018 | Bergstrom | H04W 28/0263 |
| 2018/0317120 | A1* | 11/2018 | Wang | H04W 28/0263 |
| 2019/0021135 | A1* | 1/2019 | Jin | H04W 72/087 |
| 2019/0075482 | A1* | 3/2019 | Eriksson | H04W 76/27 |
| 2019/0150022 | A1* | 5/2019 | Na | H04W 28/0236 370/329 |
| 2019/0223152 | A1* | 7/2019 | Ke | H04W 76/25 |
| 2019/0253918 | A1* | 8/2019 | Liu | H04W 40/20 |
| 2019/0268824 | A1* | 8/2019 | Kubota | H04W 28/0289 |
| 2019/0320416 | A1* | 10/2019 | Han | H04W 72/0453 |
| 2019/0357075 | A1* | 11/2019 | Van Der Velde | H04W 28/0268 |
| 2019/0357093 | A1* | 11/2019 | Xu | H04W 36/0058 |
| 2020/0128430 | A1* | 4/2020 | Yi | H04W 28/0268 |
| 2020/0196274 | A1* | 6/2020 | Ke | H04W 68/00 |

OTHER PUBLICATIONS

PCT International Application No. PCT/KR2018/000516, Notification of Transmittal of the International Search Report and the Written Opinion of the International Searching Authority, or Declaration dated May 21, 2018, 11 pages.
European Patent Office Application Serial No. 18739136.2, Search Report dated Aug. 11, 2020, 9 pages.
Japan Patent Office Application No. 2019-535855, Office Action dated Aug. 25, 2020, 4 pages.
ZTE et al., "Further discussion on the uplink packets handling", R2-1700158, 3GPP TSG-RAN WG2 NR ad Hoc, Jan. 2017, 6 pages.
Samsung, "NR QOS—As handling of a New QOS flow", R2-1700030, 3GPP TSG-RAN WG2 Meeting #96bis, Jan. 2017, 4 pages.

* cited by examiner

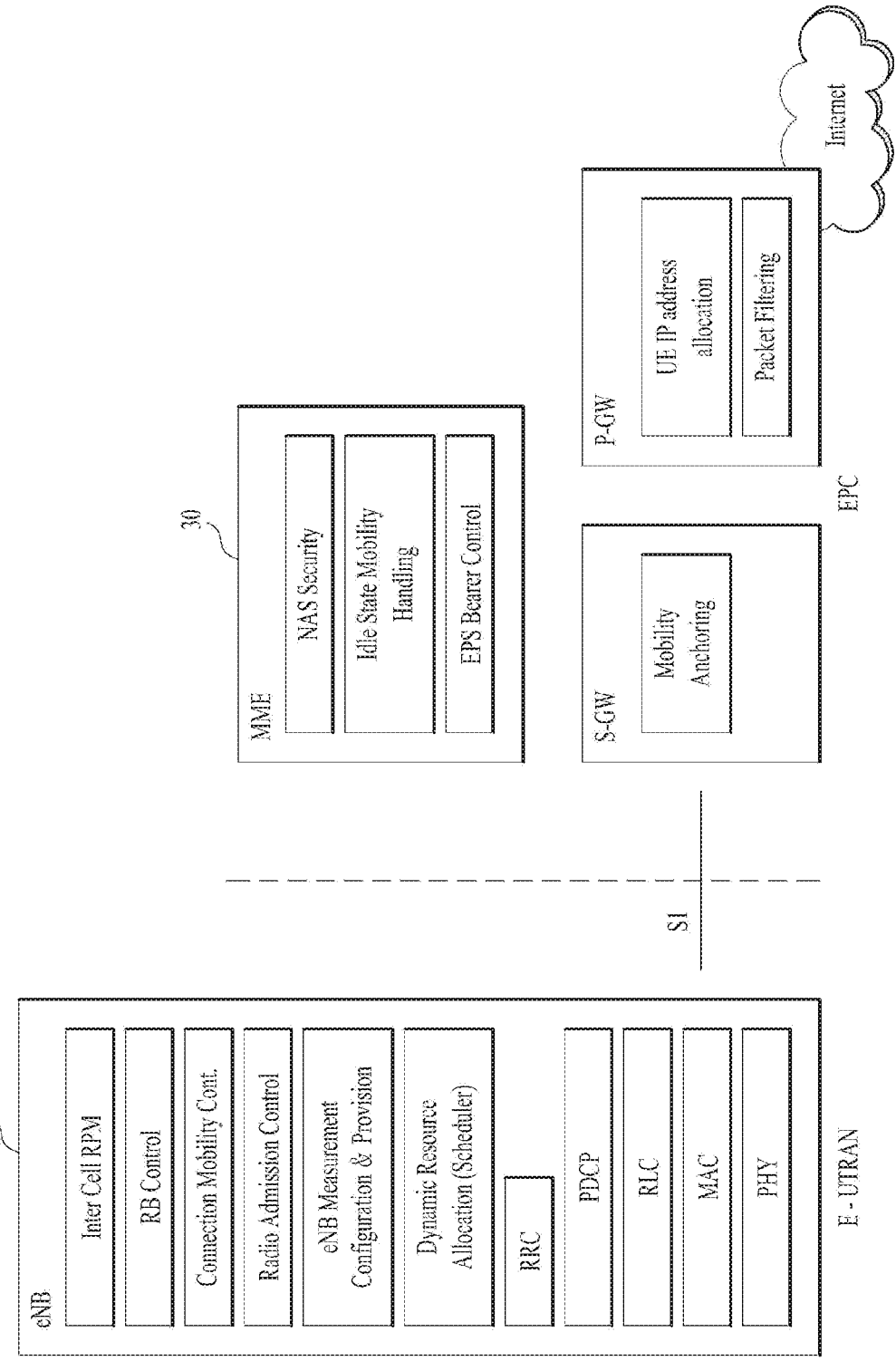

FIG. 3
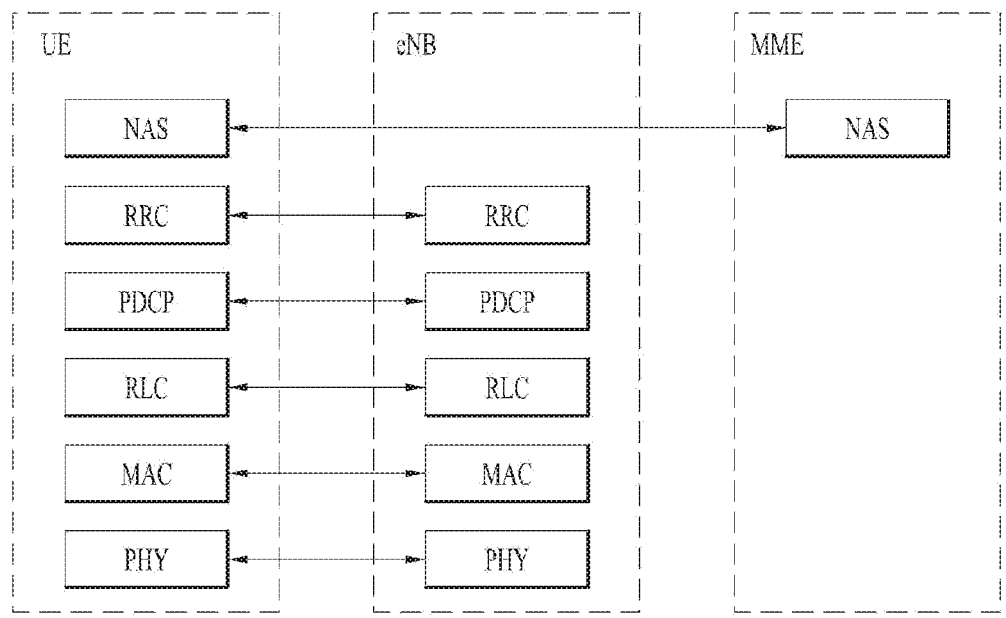
(a) Control-Plane Protocol Stack
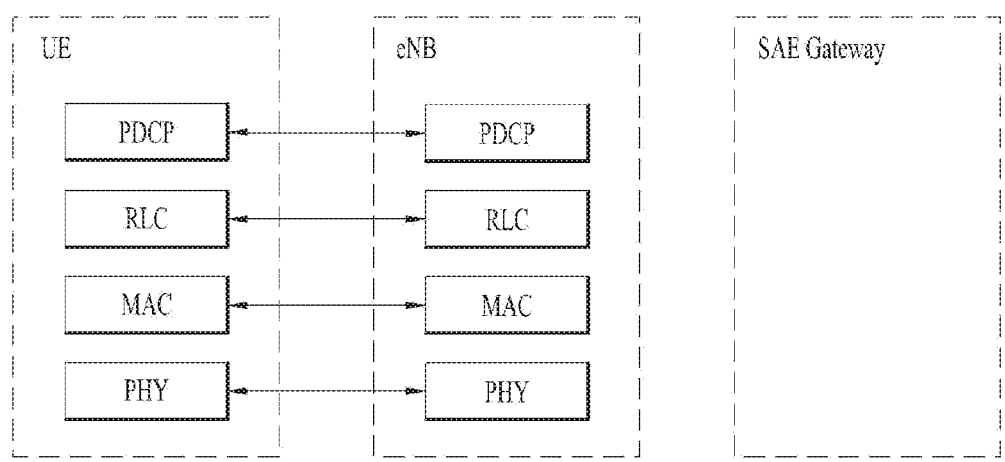
(b) User-Plane Protocol Stack

FIG. 5
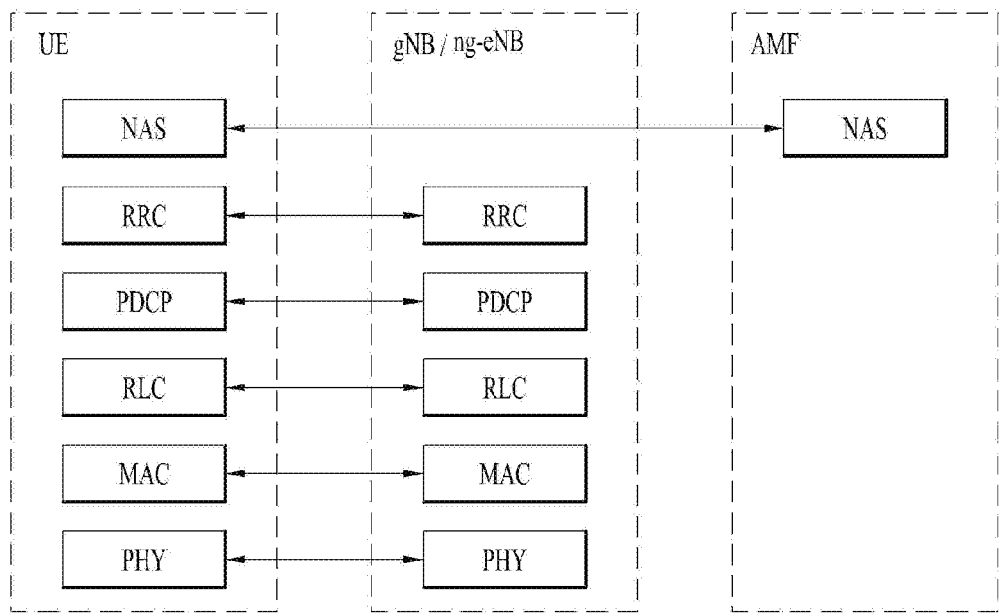
(a) Control-Plane Protocol Stack
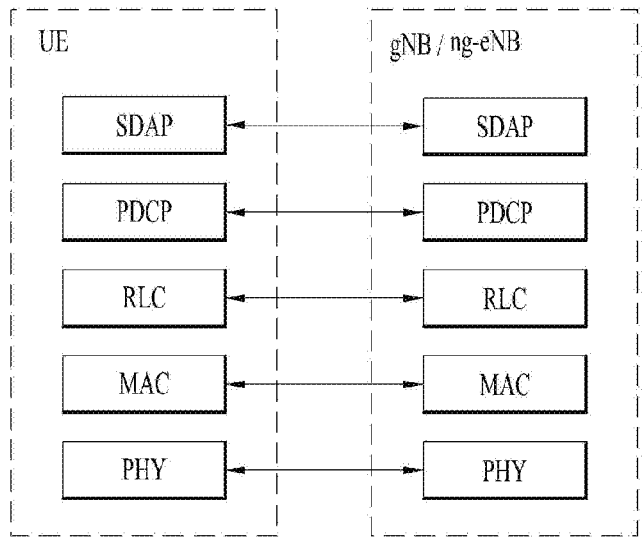
(b) User-Plane Protocol Stack

METHOD FOR TRANSMITTING UL PACKET BASED ON QUALITY OF SERVICE (QOS) FLOW IN WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2018/000516, filed on Jan. 11, 2018, which claims the benefit of U.S. Provisional Application No. 62/446,351, filed on Jan. 13, 2017, and 62/446,832, filed on Jan. 16, 2017, the contents of which are hereby incorporated by reference herein in its entirety.

TECHNICAL FIELD

The present invention relates to a wireless communication system and, more particularly, to a method for transmitting UL packet based on Quality of Service (QoS) flow in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for transmitting UL packet based on QoS flow in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, it is proposed of performing UL packet transmission of IP flow which is not matched to any of IP flow to QoS flow mapping rules in the UE.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 5 is a diagram showing a control plane and a user plane of a radio interface protocol between a UE and a NG-RAN based on a 3rd generation partnership project (3GPP) radio access network standard;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
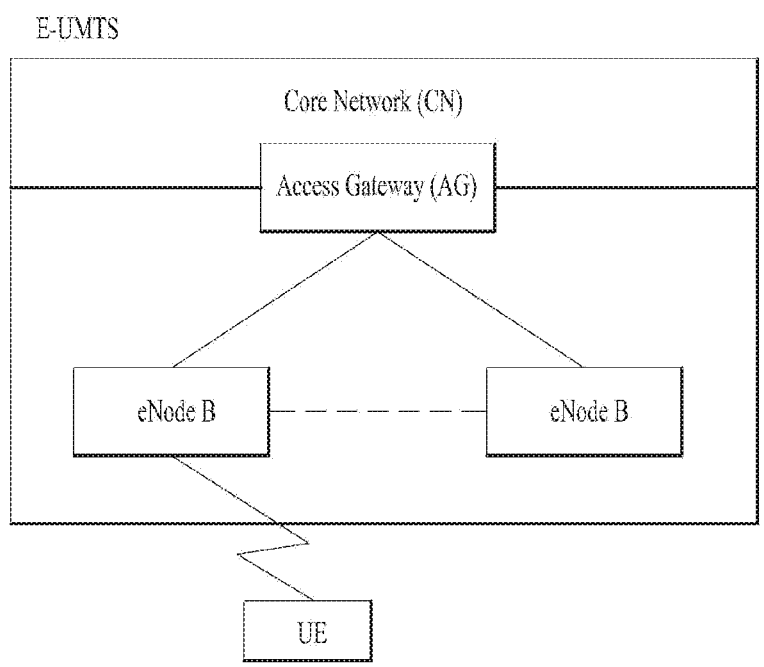
FIG. 1 is a diagram showing a network structure of an Evolved Universal Mobile Telecommunications System (E-UMTS) as an example of a wireless communication system.
Figure 2A:
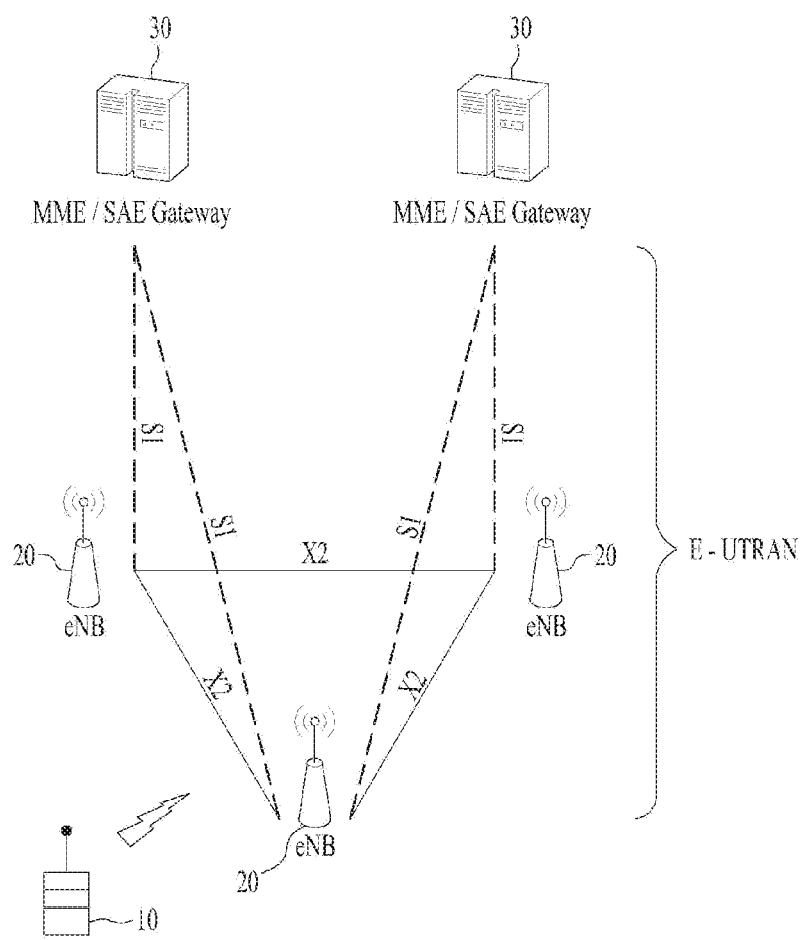
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
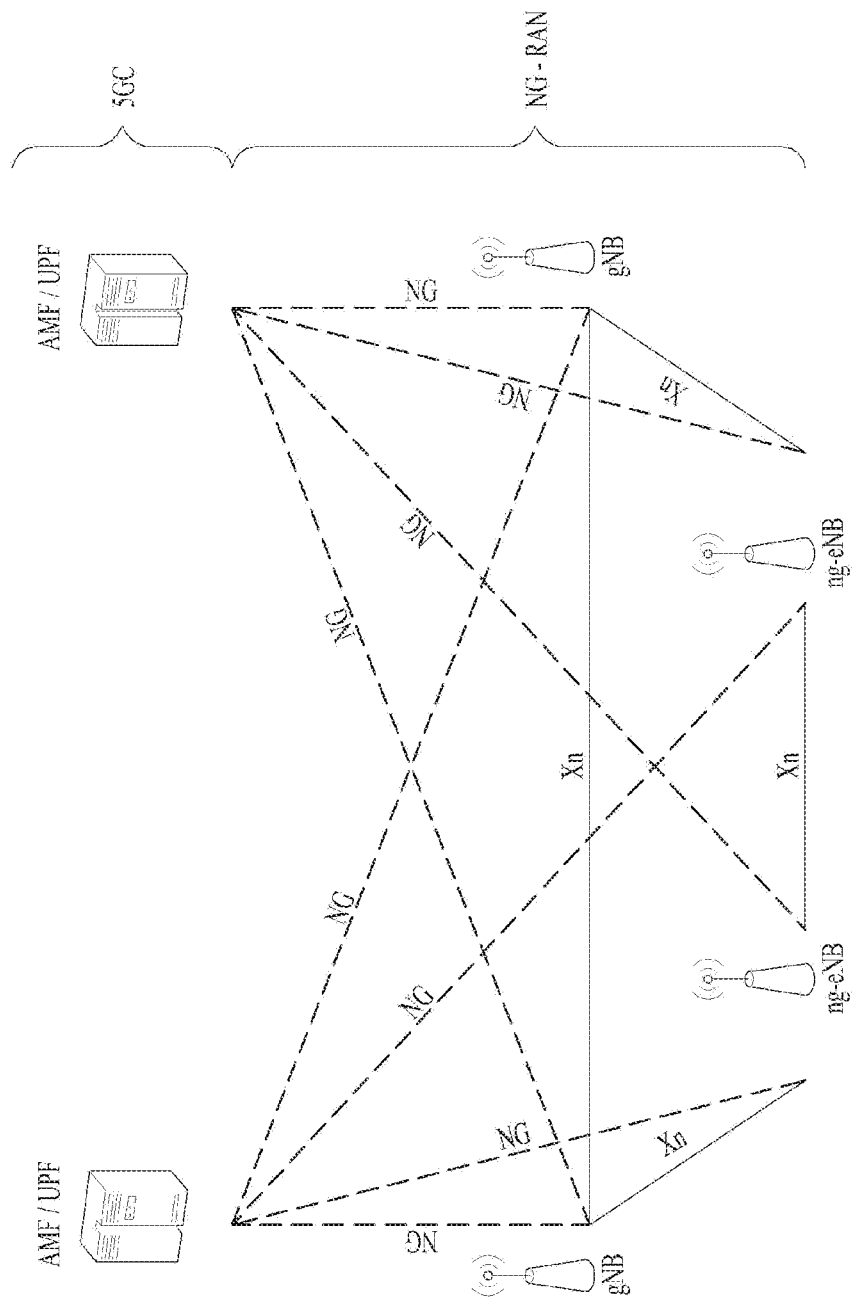
FIG. 4A is a block diagram illustrating network structure of NG Radio Access Network (NG-RAN) architecture.
Figure 4B:
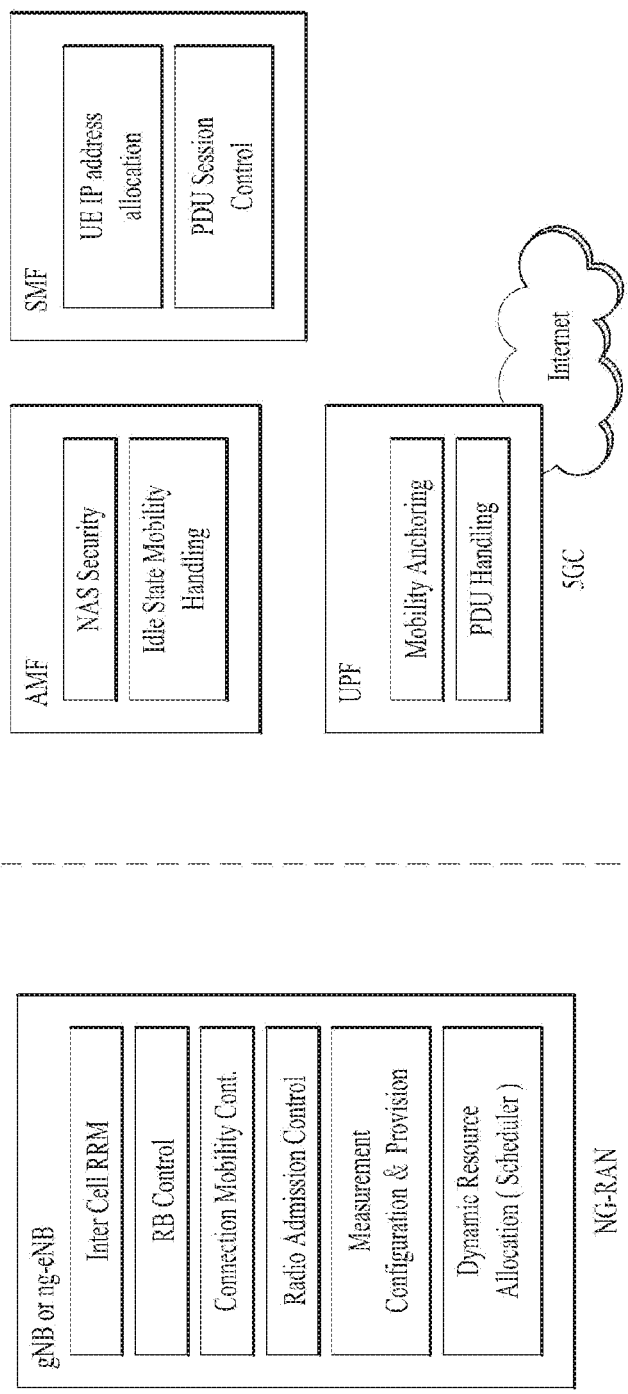
FIG. 4B is a block diagram depicting architecture of functional Split between NG-RAN and 5G Core Network (5GC)

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
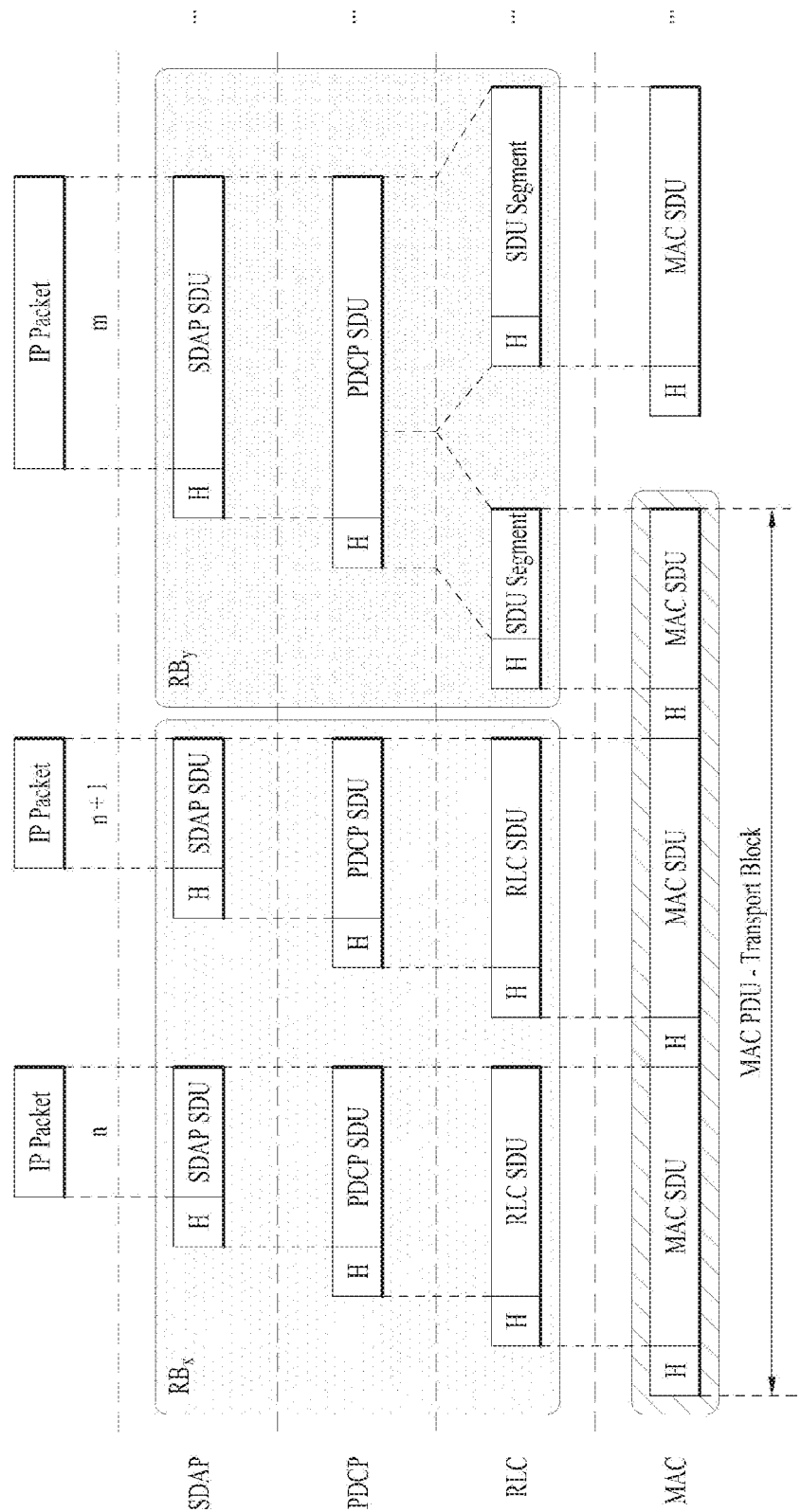
FIG. 6 is an example for L2 data flow between a UE and a NG-RAN.

FIG. 6 is an example for L2 data flow between a UE and a NG-RAN.

An example of the Layer 2 Data Flow is depicted on FIG. 6, where a transport block is generated by MAC by concatenating two RLC PDUs from RBx and one RLC PDU from RBy. The two RLC PDUs from RBx each corresponds to one IP packet (n and n+1) while the RLC PDU from RBy is a segment of an IP packet (m).

Figure 7:
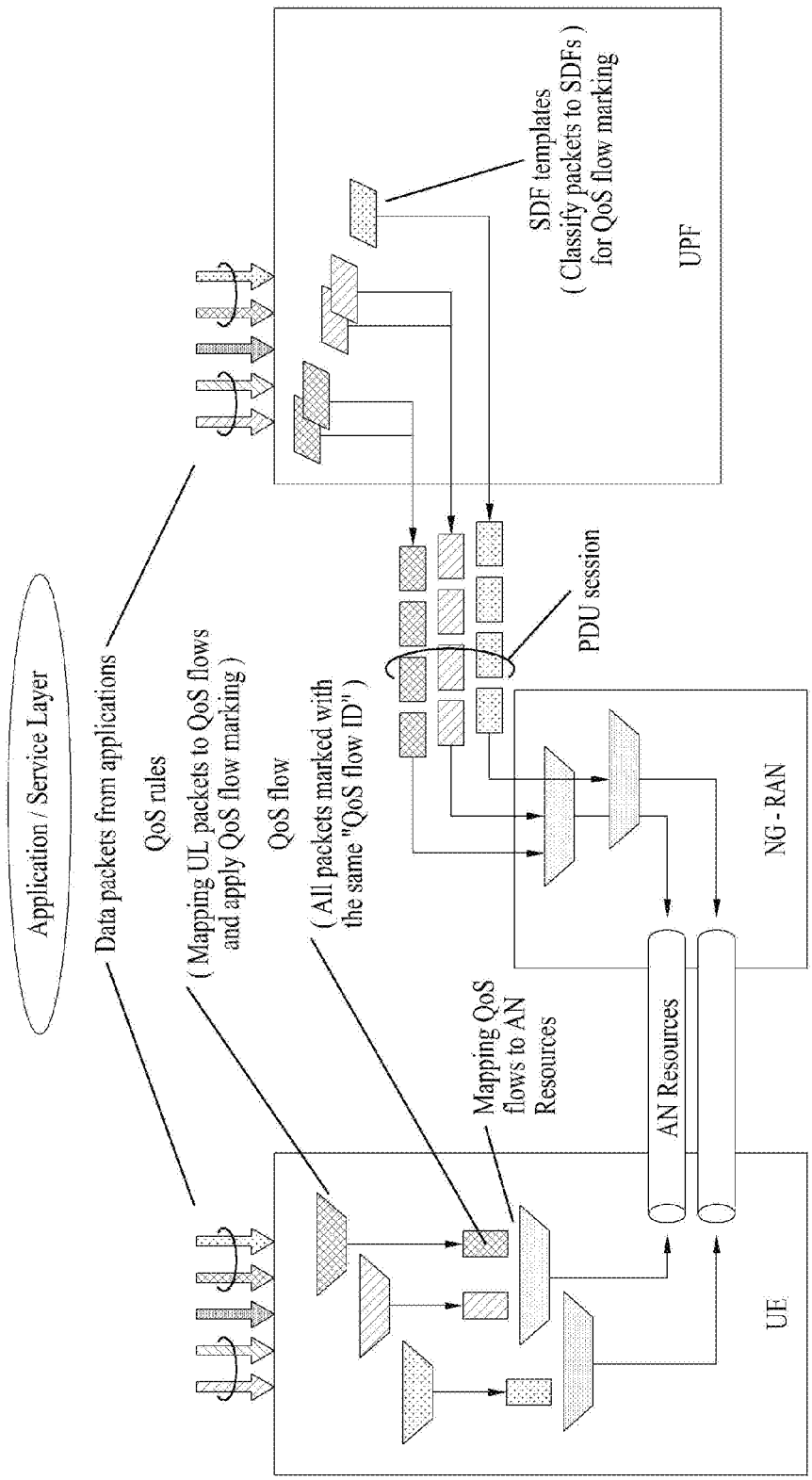
FIG. 7 is a diagram for classification and user plane marking for QoS flows and mapping to NG-RAN resources.

FIG. 7 is a diagram for classification and user plane marking for QoS flows and mapping to NG-RAN resources.

The 5G QoS model is based on QoS flows. The 5G QoS model supports both QoS flows that require guaranteed flow bit rate (GBR QoS flows) and QoS flows that do not require guaranteed flow bit rate (non-GBR QoS flows). The 5G QoS model also supports reflective QoS.

The QoS flow is the finest granularity of QoS differentiation in the PDU session. A QoS Flow ID (QFI) is used to identify a QoS flow in the 5G System. User plane traffic with the same QFI within a PDU Session receives the same traffic forwarding treatment (e.g. scheduling, admission threshold). The QFI is carried in an encapsulation header on N3 (and N9) i.e. without any changes to the e2e packet header. QFI shall be used for all PDU session types. The QFI shall be unique within a PDU session. The QFI may be dynamically assigned or may be equal to the 5QI.

Within the 5G System, a QoS flow is controlled by the SMF and may be preconfigured, or established via the PDU Session Establishment procedure, or the PDU Session Modification procedures.

Any QoS flow is characterized by: i) a QoS profile provided by the SMF to the NG-RAN via the AMF over the N2 reference point or preconfigured in the NG-RAN, ii) one or more QoS rule(s) which can be provided by the SMF to the UE via the AMF over the N1 reference point and/or derived by the UE by applying reflective QoS control, and iii) one or more SDF templates provided by the SMF to the UPF.

The UE performs the classification and marking of UL user plane traffic, i.e. the association of UL traffic to QoS flows, based on QoS rules. These QoS rules may be explicitly provided to the UE (using the PDU Session Establishment/Modification procedure), pre-configured in the UE or implicitly derived by UE by applying reflective QoS.

Reflective QoS enables the UE to map UL user plane traffic to QoS flows by creating UE derived QoS rules in the UE based on the received DL traffic.

A QoS rule contains a QoS rule identifier which is unique within the PDU session, the QFI of the associated QoS flow and a packet filter set for UL and optionally for DL and a precedence value. Additionally, for a dynamically assigned QFI, the QoS rule contains the QoS parameters relevant to the UE (e.g. 5QI, GBR and MBR and the Averaging Window). There can be more than one QoS rule associated with the same QoS Flow (i.e. with the same QFI)

A default QoS rule is required for every PDU Session and associated with the QoS flow of the default QoS rule. The principle for classification and marking of user plane traffic and mapping of QoS flows to NG-RAN resources is illustrated in FIG. 7.

In DL, incoming data packets are classified by the UPF based on SDF templates according to their SDF precedence, (without initiating additional N4 signaling). The UPF conveys the classification of the user plane traffic belonging to a QoS flow through an N3 (and N9) user plane marking using a QFI. The NG-RAN binds QoS flows to NG-RAN resources (i.e. Data Radio Bearers). There is no strict 1:1 relation between QoS flows and NG-RAN resources. It is up to the NG-RAN to establish the necessary NG-RAN resources that QoS flows can be mapped to.

In UL, the UE evaluates UL packets against the packet filter set in the QoS rules based on the precedence value of QoS rules in increasing order until a matching QoS rule (i.e. whose packet filter matches the UL packet) is found. The UE uses the QFI in the corresponding matching QoS rule to bind the UL packet to a QoS flow.

Figure 8:
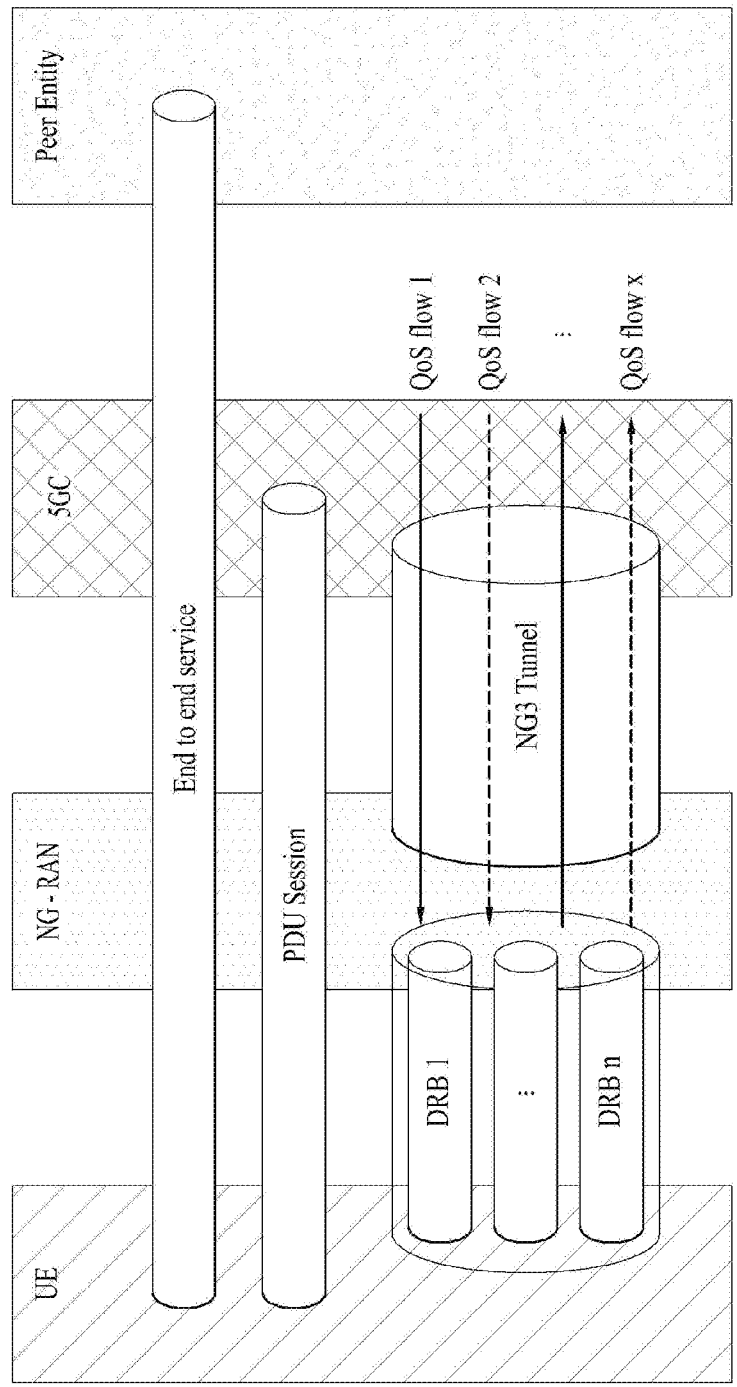
FIG. 8 is a conceptual diagram for 5G QoS model.

FIG. 8 is a conceptual diagram for 5G QoS model.

As shown in the FIG. 8, multiple user plane traffics (e.g, IP flow) can be multiplexed onto the same QoS flow and multiple QoS flows can be multiplexed onto the same DRB (Data Radio Bearer). In DL, 5GC is responsible for the IP flow to QoS flow mapping and NG-RAN is responsible for the QoS flow to DRB mapping. In UL, the UE performs a 2-step mapping of IP flows, in which NAS is responsible for the IP flow to QoS flow mapping, and AS is responsible for the QoS flow to DRB mapping. In other words, the UE maps an IP flow to a QoS flow according to the QoS rules such as default QoS rule, pre-authorised QoS rule and/or reflective QoS rule which 5GC provides to the UE. And then, the UE maps the QoS flow to a DRB according to the AS mapping rules which the NG-RAN provides to the UE.

If the IP flow is not matched to any of QoS rule(s) in the UE, the UE can't map the IP flow to a QoS flow and thus can't transmit UL packet of the IP flow to network since the IP flow doesn't belong to any QoS flows. For handling this case, the UE can trigger a NAS procedure to request to get an appropriate QoS rule. However, it introduces additional delays since the UE has to wait for the response corresponding to the request. The problem becomes severe for urgent UL packet which needs to be transmitted immediately.

This invention relates to a method and apparatus for performing UL packet transmission of IP flow which is not matched to any of QoS rule(s) in the UE.

Figure 9:
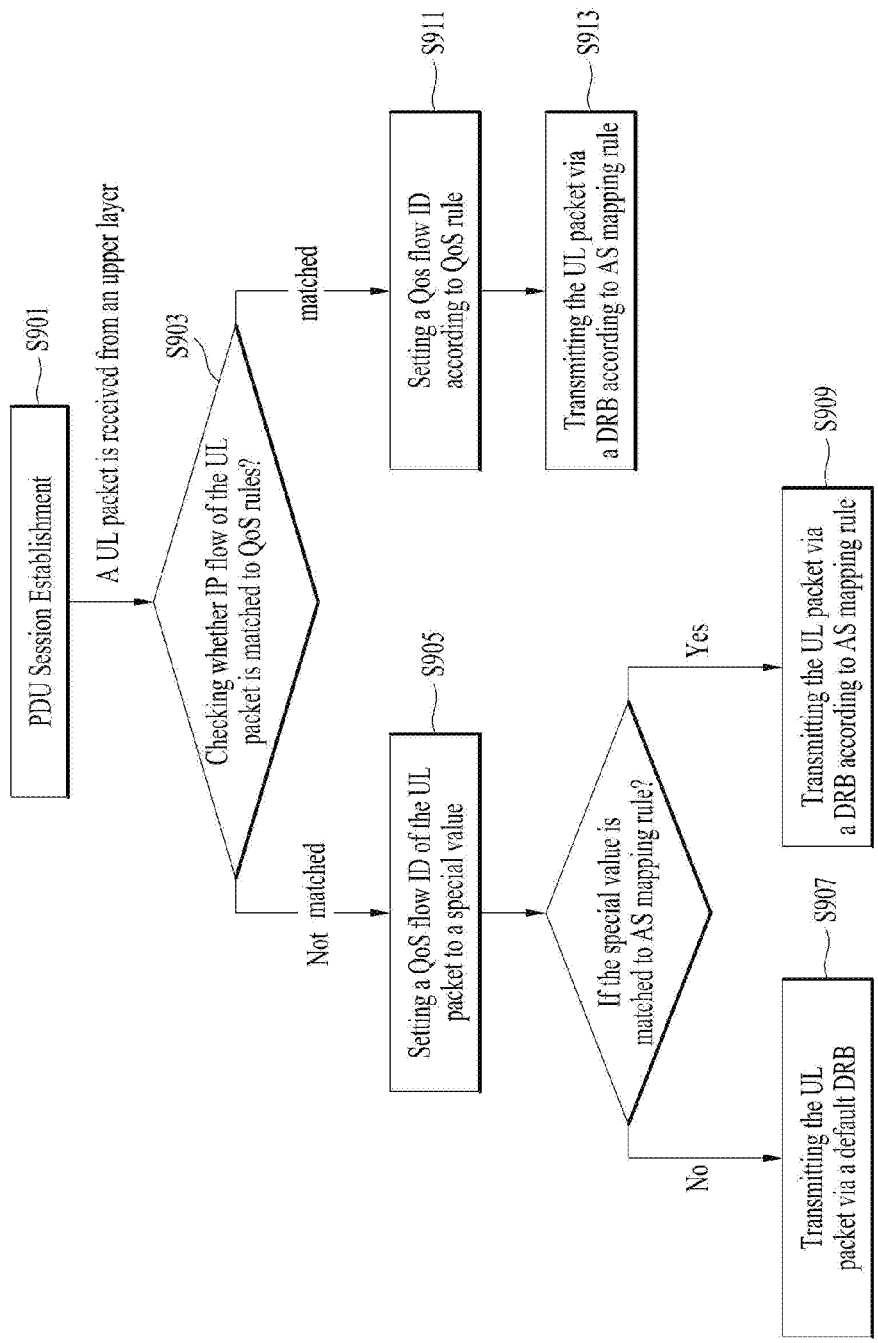
FIG. 9 is a conceptual diagram for transmitting UL packet based on QoS flow in wireless communication system according to embodiments of the present invention.

FIG. 9 is a conceptual diagram for transmitting UL packet based on QoS flow in wireless communication system according to embodiments of the present invention.

Some terms of this invention are defined as the followings:

PDU session refers to association between the UE and a data network that provides a PDU connectivity service.

PDU connectivity service refers to a service that provides exchange of PDU (Packet Data Units) between a UE and a data network.

QoS rule refers to a set of information enabling the detection of a service data flow (e.g., IP flow) and defining its associated QoS parameters. It consists of NAS-level QoS profile (e.g., QoS characteristics, QoS marking) and packet filters. Three types of QoS rule are Default QoS Rule, Pre-authorised QoS rule and Reflective QoS rule.

Default QoS rule refers to a mandatory QoS rule per PDU Session. It is provided at PDU session establishment to UE.

Pre-authorised QoS rule refers to any QoS rule (different from the Default QoS rule) provided at PDU Session Establishment.

Reflective QoS rule refers to the QoS rule which is created by UE based on QoS rule applied on the DL traffic.

QoS marking refers to a scalar that is used as a reference to a specific packet forwarding behaviour Packet filter refers to information for matching service data flows. The format of the packet filters is a pattern for matching the IP 5 tuple (source IP address or IPv6 network prefix, destination IP address or IPv6 network prefix, source port number, destination port number, protocol ID of the protocol above IP). Service data flows are mapped to a QoS flow according to DL/UL packet filter.

QoS flow refers to finest granularity for QoS treatment.

NG (Next Generation) system consists of AMF (Access and Mobility Management Function), SMF (Session Management Function) and UPF (User plane Function).

AS mapping rule refers to a set of information related to the association between QoS flow and the Data Radio Bearer (DRB) transporting that QoS flow.

During the PDU Session Establishment (S901), UE receives QoS rule(s) related to the PDU session from 5GC, and receives AS-mapping rule(s) and DRB configuration information for the PDU session from NG-RAN.

The QoS rule(s) related to the PDU session is an IP flow (i.e. user plane traffic) to QoS flow mapping rule configured to the UE.

The AS-mapping rule(s) is a UL QoS flow to DRB mapping rule configured to the UE.

The UE saves the received QoS rule(s) and AS-mapping rule(s), and establishes DRB such as default DRB and/or Dedicated DRB (non-default DRB).

The default DRB is established by NG-RAN at PDU Session Establishment. If the first packet of the flow is UL packet, if no mapping rule is configured in the UE, the packet is sent through default DRB to the network.

After that, UE may update QoS rules by receiving NAS message including QoS rules or by receiving DL packet indicating the Reflective QoS.

When a UL packet is received from an upper layer, the UE checks whether the IP flow of the UL packet is matched to any of the IP flows defined in UL packet filters (UL IP flow to QoS flow mapping rules) of the saved QoS rules (S903).

If the IP flow of the UL packet isn't matched to any of the IP flows defined in the saved QoS rule(s), the UE sets the QoS Flow ID of the UL packet to a special value (S905).

If the special value is not matched to any of QoS flow IDs defined in the saved AS-mapping rule, the UE maps the IP flow of the UL packet to the default DRB of the corresponding PDU session, and transmits the UL packet with the QoS Flow ID set to the special value to a network via a default DRB (S907).

In this case, the UL packet transmitted via the default DRB has a QoS flow ID of which all bit of a field is set to '0', or a QoS flow ID of which all bit of a field is set to '1'.

The QoS Flow ID with the special value such as "all 0" or all "1", called special QoS Flow ID, is used to notify NG-RAN of "no matching of QoS rules?.

The step of S905 (i.e., the UE attaches the special QoS Flow ID to the UL packet) is performed by one of radio protocol layers (e.g. PDCP, RLC, MAC, or a new layer). Preferably, the new layer is a SDAP layer which is higher than the PDCP entity.

If the special value is one of QoS flow IDs defined in the AS-mapping rules (UL QoS flow to DRB mapping rule) configured to the UE, the UE maps the IP flow of the UL packet to a DRB mapped to the special value defined in the saved AS mapping rule, and transmits the UL packet with the QoS Flow ID set to the special value to the network via the DRB mapped to the special value defined in the saved AS mapping rule (S909).

Meanwhile, during the PDU Session Establishment, the UE can receive 'TX allowance for no matching UL packet' and 'Allowed QoS flow(s) for no matching UL packet' from the 5GC and/or NG-RAN, additionally.

The 'TX allowance for no matching UL packet' indicates if the UE is allowed to send UL IP flow(s) with no matching of QoS rule(s) to network, and 'Allowed QoS flow for no matching UL packet' indicates QoS flow(s) to which the UE is allowed to map the UL IP flow(s).

If the UE is allowed to send the UL IP flow(s) to the NG-RAN, value of 'TX allowance for no matching UL packet' is '1'. Otherwise, it is '0'.

If the UE receives 'TX allowance for no matching UL packet' whose value is '1' but doesn't receive any 'Allowed QoS flow for no matching UL packet', the UE presumes that the UL IP flow(s) can be mapped to one of all QoS flows defined in default QoS rule.

If the IP flow of the UL packet isn't matched to any of the IP flows defined in the saved QoS rule(s) and the saved 'no matching UL packet handling IE' indicates that the UE is allowed to send the UL packet to network, the UE selects a QoS flow from the allowed QoS flow(s) for no matching UL packet in the saved QoS rule(s) of the corresponding PDU session, and then the UE sets the QoS Flow ID of the UL packet to a value of the selected QoS flow defined by the QoS rule. If there are several allowed QoS flows, the UE may select the QoS flow with the most similar QoS characteristics to those required for the IP flow of the UL packet. After that, the UE maps the selected QoS flow of the UL packet to a DRB defined by the AS mapping rules and transmits the UL packet with the QoS Flow ID to the NG-RAN node via the DRB.

If the IP flow of the UL packet isn't matched to any of the IP flows defined in the saved QoS rule(s) and the saved 'no matching UL packet handling IE' indicates that the UE is not allowed to send the UL packet to network, the UE discards the UL packet and notifies the upper layers in the UE of delivery failure.

If the IP flow of the UL packet is matched to one of the IP flows defined in the saved QoS rule(s), the UE sets the QoS Flow ID of the UL packet to a value defined by the QoS rules (S911), and then maps the IP flow of the UL packet to a DRB defined by the AS mapping rules. The UE transmits the UL packet with the QoS Flow ID to the NG-RAN node via the DRB (S913).

Figure 10:
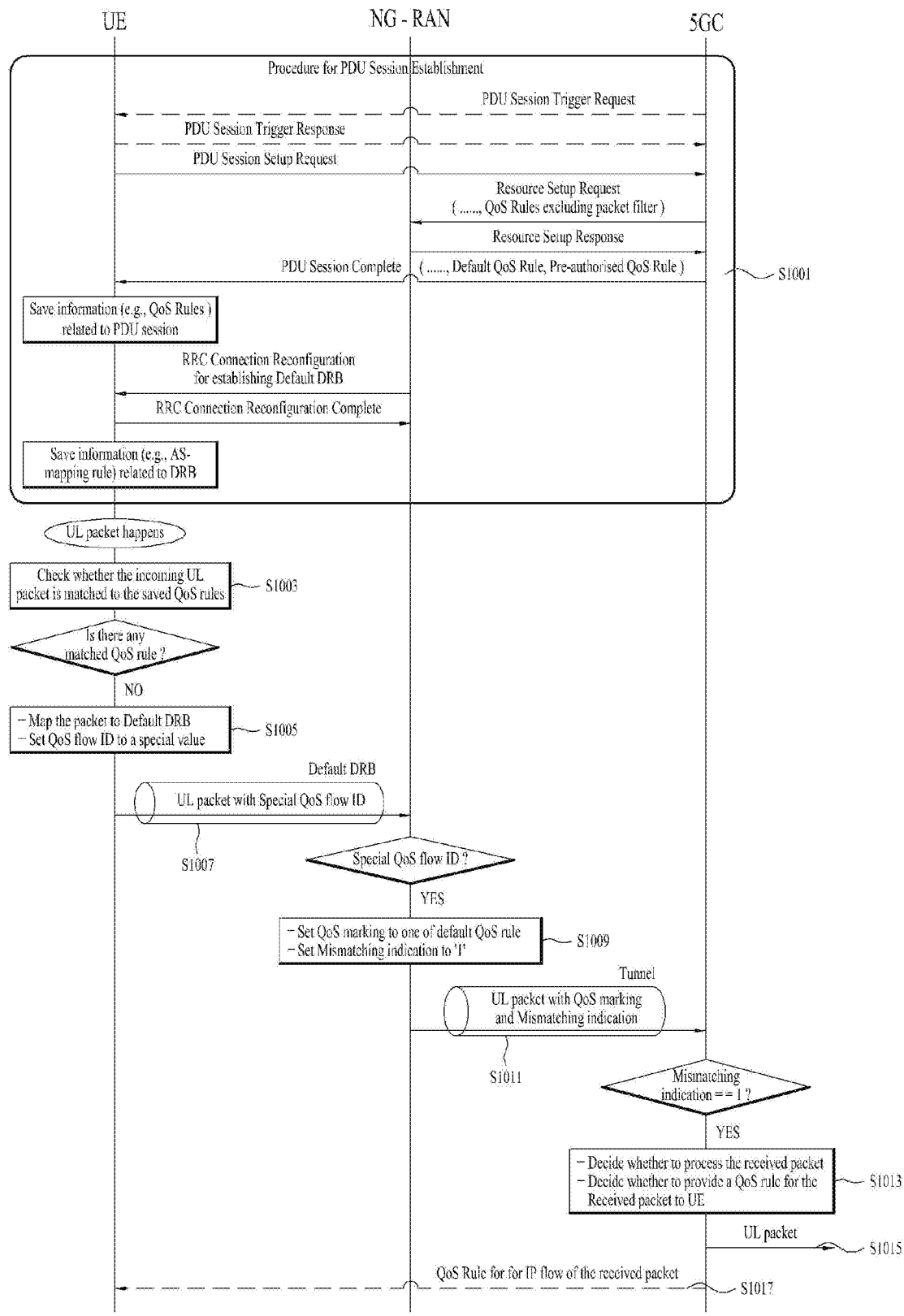
FIGS. 10 to 13 are examples for transmission of UL packet which is not matched to any of QoS rule according to embodiments of the present invention.

FIG. 10 is an example for transmission of UL packet which is not matched to any of QoS rules according to embodiments of the present invention.

During the PDU Session Establishment, 5GC transmits QoS rule(s) related to the PDU session to the UE and transmits QoS rule(s) excluding packet filter to the NG-RAN. The NG-RAN sends the UE the RRC message for default DRB establishment of the corresponding PDU session. The RRC message includes some configurations such as AS-mapping rule. The NG-RAN receives RRC message from UE as response to the RRC message.

During the PDU Session Establishment, UE receives QoS rule(s) related to the PDU session from 5GC, and receives AS-mapping rule(s) and default DRB configuration information for the PDU session from NG-RAN. And the UE saves the received QoS rule(s) and AS-mapping rule(s), and establishes default DRB. After that, the UE may update QoS rules by receiving NAS message including QoS rules or by receiving DL packet indicating the Reflective QoS (S1001).

When a UL packet is received from an upper layer, the UE checks whether the IP flow of the UL packet is matched to any of the IP flows defined in the saved QoS rules (S1003).

If the IP flow of the UL packet isn't matched to any of the IP flows defined in the saved QoS rule(s), the UE sets the QoS Flow ID of the UL packet to a special value, and then maps the IP flow of the UL packet to the default DRB of the corresponding PDU session (S1005). After that, the UE transmits the UL packet with the special QoS Flow ID to the NG-RAN via the default DRB (S1007).

Figure 11:
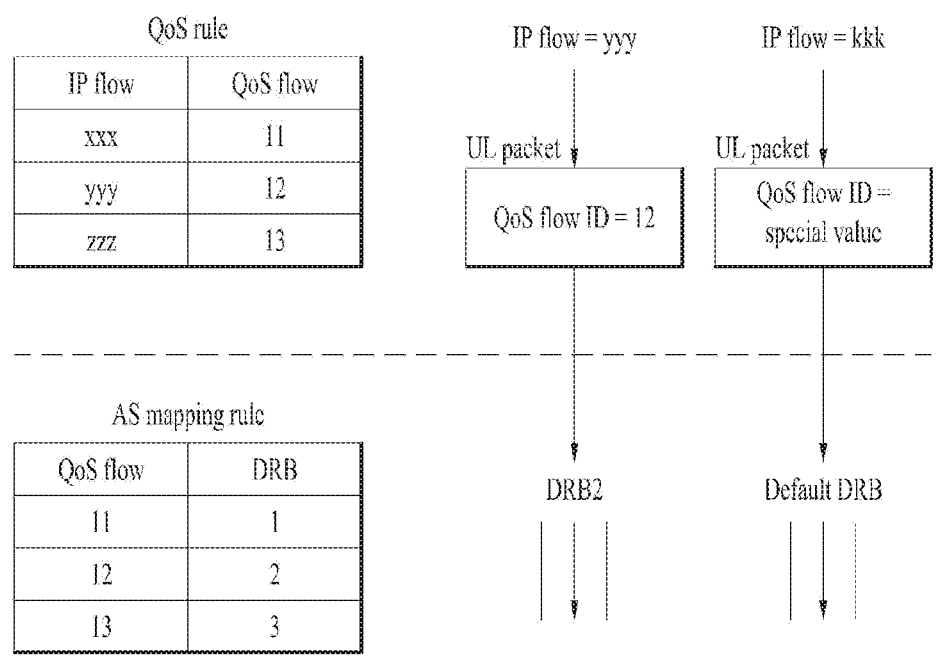

FIG. 11 shows an example for the Steps of S1003 to S1007.

When a UL packet of which IP flow is 'yyy' is received from an upper layer, the UE checks whether the 'yyy' is matched one of the IP flows defined in the saved QoS rules. Since the 'yyy' is matched to '12' of QoS flow ID in the QoS rule, the UE maps the UL packet to the DRB 2 according to the AS mapping rule. On the other hand, if IP flow is 'kkk', since the 'kkk' is not matched to any of IP flows in the saved QoS rule, the UE sets the QoS flow ID to special value, and maps the IP flow of the UL packet to the default DRB of the corresponding PDU session, and transmits the UL packet with the special QoS Flow ID to a network via a default DRB.

Following the description of FIG. 10 above, when the NG-RAN receives UL packet with special QoS flow ID (S1007), the NG-RAN determines and sets the QoS marking and selects the tunnel based on default QoS rule of the corresponding PDU session and DRB ID. Also, the NG-RAN indicates the mismatching, by setting mismatching indicator to '1' (S1009).

And then, NG-RAN transmits UL packet with the QoS marking and the mismatching indicator to the 5GC (S1011).

When the 5GC receives UL packet with the mismatching indicator which is set to '1' (S1011), the 5GC decides whether to process the received packet, and decides whether to provide a QoS rule for the received packet to UE (S1013).

If the 5GC decides to process the received packet, it sends the packet to peer entity (S1015). Otherwise, it discards the packet.

If the 5GC decides to provide a QoS rule for the IP flow of the received packet, the 5GC transmits QoS rules to UE and transmits QoS rules excluding packet filter to NG-RAN (S1017).

Figure 12:
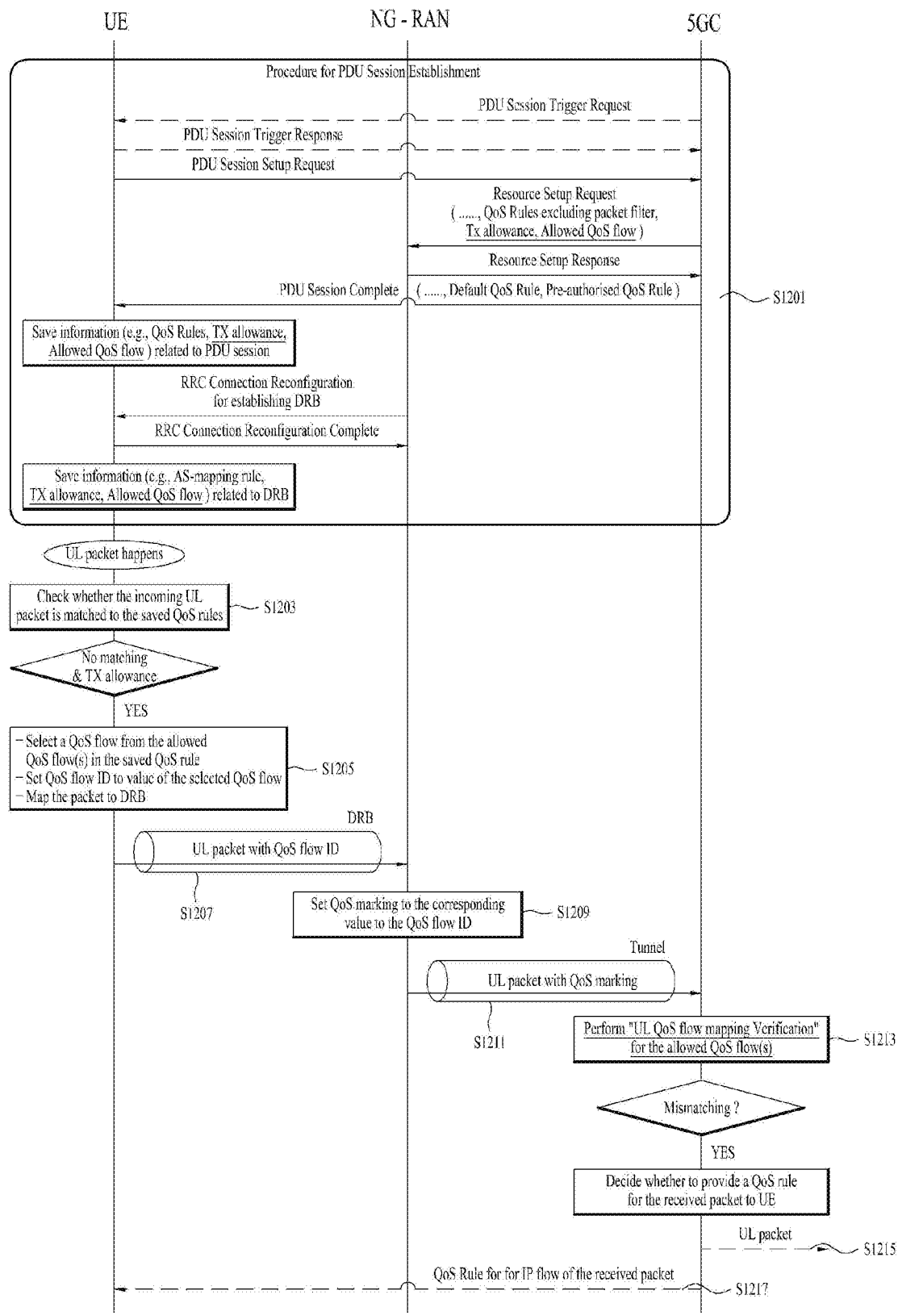

FIG. 12 is an example for transmission of UL packet which is not matched to any of QoS rules according to embodiments of the present invention.

During the PDU Session Establishment, the 5GC transmits QoS rule(s) and TX allowance and Allowed QoS flow for no matching UL packet related to the PDU session to the UE and transmits TX allowance for no matching UL packet, Allowed QoS flow for no matching UL packet and QoS rule(s) excluding packet filter to the NG-RAN.

'TX allowance for no matching UL packet' indicates if the UE is allowed to send UL IP flow(s) with no matching of QoS rule(s) to network. If the UE is allowed to send the UL IP flow(s), 'TX allowance for no matching UL packet' is set to '1'. Otherwise, it is set to '0'. 'Allowed QoS flow' indicates QoS flow(s) to which the UE is allowed to map the UL flow(s). If the 5GC allows the UE to map the UL flow(s) to one of all QoS flows defined in default QoS rule, the 5GC may not transmit this field to the UE.

During the PDU Session Establishment, NG-RAN sends the UE the RRC message for DRB establishment of the corresponding PDU session. The RRC message includes some configurations such as AS-mapping rule, TX allowance for no matching UL packet and Allowed QoS flow for no matching UL packet. During the PDU Session Establishment, NG-RAN receives RRC message from UE as response to the RRC message.

When the UE receives QoS rule(s) related to the PDU session from 5GC, and receives AS-mapping rule(s) and DRB configuration information for the PDU session from NG-RAN, and information for TX allowance and Allowed QoS flow for no matching UL packet related to the PDU session from the 5GC and/or NG-RAN, the UE saves the received QoS rule(s), AS-mapping rule(s), TX allowance for no matching UL packet and Allowed QoS flow(s) for no matching UL packet, and establishes DRB such as default DRB and/or Dedicated DRB. After that, UE may update QoS rules by receiving NAS message including QoS rules or by receiving DL packet indicating the Reflective QoS (S1201).

When a UL packet is received from an upper layer, the UE checks whether the IP flow of the UL packet is matched to any of the IP flows defined in the saved QoS rules (S1203).

If the IP flow of the UL packet isn't matched to any of the IP flows defined in the saved QoS rule(s) and the saved 'no matching UL packet handling IE' indicates that the UE is allowed to send the UL packet to network, the UE selects a QoS flow from the allowed QoS flow(s) for no matching UL packet in the saved QoS rule(s) of the corresponding PDU session, and then the UE sets the QoS Flow ID of the UL packet to a value of the selected QoS flow defined by the QoS rule. After that, the UE maps the selected QoS flow of the UL packet to a DRB defined by the AS mapping rules and attaches the QoS Flow ID to the UL packet (S1205). The UE transmits the UL packet with the QoS Flow ID to the NG-RAN via the DRB (S1207).

Figure 13:
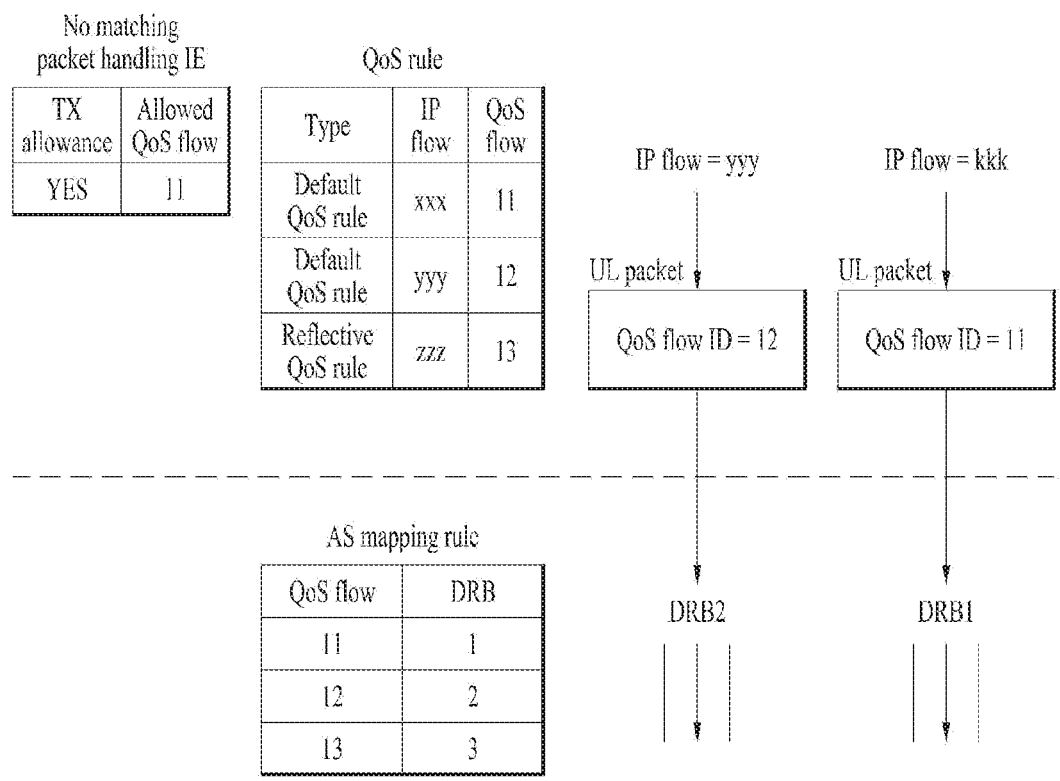

FIG. 13 shows an example for the Steps of S1203 to S1207.

When a UL packet of which IP flow is 'yyy' is received from an upper layer, the UE checks whether the 'yyy' is matched one of the IP flows defined in the saved QoS rules. Since the 'yyy' is matched to '12' of QoS flow ID in the QoS rule, the UE maps the UL packet to the DRB 2 according to the AS mapping rule. On the other hand, if IP flow is 'kkk', since the 'kkk' is not matched to any of IP flows in the saved QoS rule, the UE checks the 'kkk' can be transmitted to the network using the TX allowance for no matching UL packet. And then the UE checks 'Allowed QoS flow for no matching UL packet'

In this case, since Tx allowance for no matching UL packet' indicates 'yes' and allowed QoS flow is '11', the UE sets the QoS Flow ID of the UL packet to '11' and maps the UL packet to DRB 1 and transmits the UL packet to the network via the DRB 1.

Following the description of FIG. 12 above, when NG-RAN receives UL packet with QoS flow ID (S1207), the NG-RAN determines and sets the QoS marking, and selects the tunnel based on QoS rule(s) of the corresponding PDU session and DRB ID (S1209). And then, NG-RAN transmits UL packet with the QoS marking to the 5GC (S1211).

When 5GC receives UL packet with QoS marking (S1211), 5GC should always monitor all packets of the allowed QoS flows for no matching UL packet and verify UL QoS flow to IP flow mapping (S1213) if 5GC allowed the UE to send no matching UL packet to network.

When detecting the mismatching, 5GC sends the packet to peer entity and decides to provide a QoS rule for the IP flow of the received packet. According to the decision, 5GC may transmit QoS rules to UE (S1205) and transmit QoS rules excluding packet filter to NG-RAN (S1217).

Figure 14:
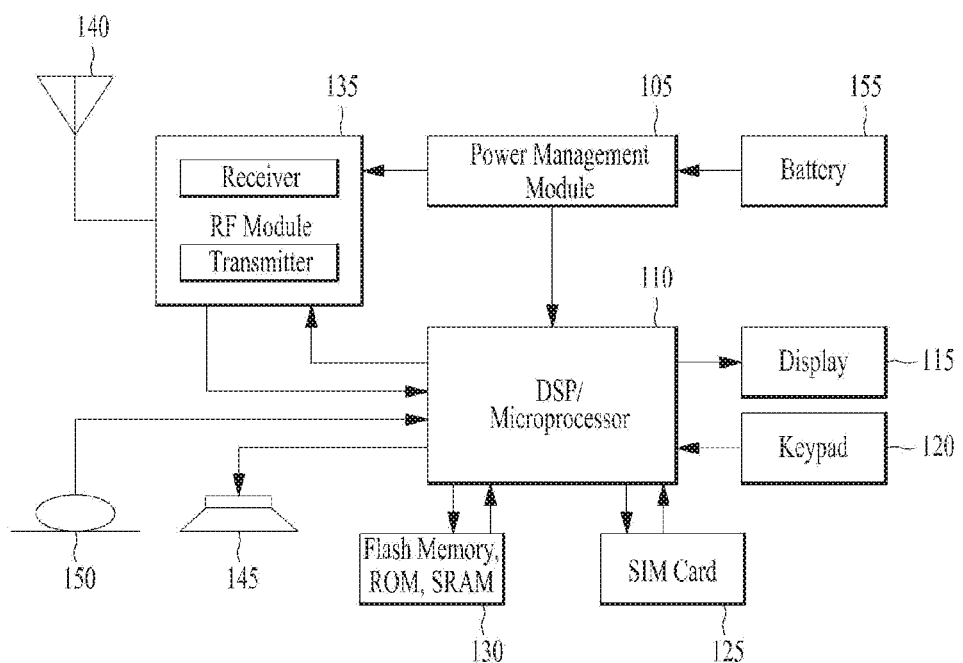
FIG. 14 is a block diagram of a communication apparatus according to an embodiment of the present invention.

FIG. 14 is a block diagram of a communication apparatus according to an embodiment of the present invention.

The apparatus shown in FIG. 14 can be a user equipment (UE) and/or eNB adapted to perform the above mechanism, but it can be any apparatus for performing the same operation.

As shown in FIG. 14, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 14 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 14 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system or NR (5G), the present invention is applicable to a variety of wireless communication systems in addition to the 3GPP LTE system or NR (5G).

What is claimed is:

1. A method for a user equipment (UE) operating in a wireless communication system, the method comprising:
   receiving uplink (UL) packet from an upper layer;
   checking whether an IP flow of the UL packet is matched to any IP flows for a single data radio bearer (DRB) that are defined in UL IP flow to QoS flow mapping rules configured to the UE;
   setting a QoS Flow ID of the UL packet to a special value based on the IP flow of the UL packet not matching to any of the IP flows for the single DRB that are defined in the UL IP flow to QoS flow mapping rules configured to the UE; and
   transmitting the UL packet with the QoS Flow ID set to the special value to a network via the single DRB as a default DRB based on the special value not matching to any of QoS flow IDs defined in UL QoS flow to DRB mapping rule configured to the UE,
   wherein the special value is a predetermined value used to notify the network that the IP flow of the UL packet is not matched to any of the IP flows for the single DRB that are defined in the UL IP flow to QoS flow mapping rules configured to the UE, and
   wherein the UL packet transmitted via the default DRB has a QoS flow ID of which all bit of a field is set to '0', or a QoS flow ID of which all bit of a field is set to '1'.

2. The method according to claim 1, wherein based on the special value being one of QoS flow IDs for the single DRB that are defined in UL QoS flow to DRB mapping rule configured to the UE, the single DRB is a DRB mapped to the special value.

3. A User Equipment (UE) for operating in a wireless communication system, the UE comprising:
   a transceiver; and
   a processor operably coupled with the transceiver and configured to:
   receive uplink (UL) packet from an upper layer,
   check whether an IP flow of the UL packet is matched to any IP flows for a single data radio bearer (DRB) that are defined in UL IP flow to QoS flow mapping rule configured to the UE,
   set a QoS Flow ID of the UL packet to a special value based on the IP flow of the UL packet not matching to any of the IP flows for the single DRB that are defined in the UL IP flow to QoS flow mapping rule configured to the UE, and
   transmit the UL packet with the QoS Flow ID set to the special value to a network via the single DRB as a default DRB based on the special value not matching to any of QoS flow IDs defined in UL QoS flow to DRB mapping rule configured to the UE,
   wherein the special value is a predetermined value used to notify the network that the IP flow of the UL packet is not matched to any of the IP flows for the single DRB that are defined in the UL IP flow to QoS flow mapping rules configured to the UE, and
   wherein the UL packet transmitted via the default DRB has a QoS flow ID of which all bit of a field is set to '0', or a QoS flow ID of which all bit of a field is set to '1'.

4. The UE according to claim 3, wherein based on the special value being one of QoS flow IDs for the single DRB that are defined in UL QoS flow to DRB mapping rule configured to the UE, the single DRB is a DRB mapped to the special value.

5. The UE according to claim 3, wherein the UL packet belongs to a PDU session for which UL packets with no matching of IP flow to QoS flow mapping rule are allowed to be transmitted to the network.

* * * * *